(12) United States Patent
D'Amico et al.

(10) Patent No.: US 7,079,609 B2
(45) Date of Patent: Jul. 18, 2006

(54) METHOD AND APPARATUS FOR REDUCING INTERFERENCE WITHIN A COMMUNICATION SYSTEM

(75) Inventors: Thomas V. D'Amico, Palatine, IL (US); Roger L. Peterson, Inverness, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/631,583

(22) Filed: Jul. 31, 2003

(65) Prior Publication Data

US 2005/0025265 A1 Feb. 3, 2005

(51) Int. Cl.
*H04D 1/04* (2006.01)
*H03K 6/04* (2006.01)

(52) U.S. Cl. ...................... 375/346; 375/358
(58) Field of Classification Search ............... 375/316, 375/346, 347, 348, 285, 296, 358, 354; 370/294, 370/285
See application file for complete search history.

(56) References Cited

U.S. PATENT DOCUMENTS

| | | | |
|---|---|---|---|
| 4,941,155 A * | 7/1990 | Chuang et al. ............. | 375/330 |
| 5,508,708 A * | 4/1996 | Ghosh et al. ............... | 342/457 |
| 5,648,958 A | 7/1997 | Counterman | |
| 5,761,430 A | 6/1998 | Gross et al. | |
| 5,764,703 A * | 6/1998 | Charvin et al. ............. | 375/317 |
| 5,917,852 A * | 6/1999 | Butterfield et al. ......... | 375/141 |
| 6,108,314 A * | 8/2000 | Jones et al. ................. | 370/294 |
| 6,317,467 B1 * | 11/2001 | Cox et al. ................... | 375/267 |
| 6,720,897 B1 * | 4/2004 | Wang ......................... | 341/143 |
| 2002/0093948 A1 | 7/2002 | Dertz et al. | |
| 2002/0164947 A1 * | 11/2002 | Nabeshima et al. ........ | 455/3.06 |
| 2003/0003905 A1 * | 1/2003 | Shvodian .................... | 455/423 |
| 2003/0083095 A1 * | 5/2003 | Liang ......................... | 455/552 |
| 2004/0081169 A1 * | 4/2004 | Kloth et al. ................ | 370/395.51 |
| 2005/0054294 A1 * | 3/2005 | Khun-Jush et al. ........ | 455/63.1 |
| 2006/0025150 A1 * | 2/2006 | Kim et al. .................. | 455/453 |

* cited by examiner

*Primary Examiner*—Jean B. Corrielus
*Assistant Examiner*—Qutub Ghulamali
(74) *Attorney, Agent, or Firm*—Kenneth A. Haas

(57) ABSTRACT

A communication system is designed that reduces co-channel interference when heterogeneous users are sharing spectrum. The system design enables a plurality of pairs of users to communicate their channel utilization time periods by using the durations and start or stop times of certain transmissions to signal the start times and durations of later transmissions. Other system users using possibly different communications protocols and different modulation technologies can measure the durations of received transmissions and to infer channel usage based on these durations.

9 Claims, 5 Drawing Sheets

100

METHOD AND APPARATUS FOR REDUCING INTERFERENCE WITHIN A COMMUNICATION SYSTEM

FIELD OF THE INVENTION

The present invention relates generally to communication systems and in particular, to a method and apparatus for reducing interference within a communication system.

BACKGROUND OF THE INVENTION

Interference often hinders performance of communication systems. One type of interference often encountered by a user within a communication system is interference generated by the transmissions of other users. This is typically caused by many users transmitting within the same channel (e.g., frequency band, time slot, or spreading code), and is referred to as co-channel interference. In order to reduce co-channel interference many communication systems employ a channel reuse pattern, where geographically adjacent transmitters transmit on different channels. For example, a cellular radio system defines geographic cells and assigns different channel sets to adjacent cells. Another common means of reducing co-channel interference is to employ smart dynamic resource management wherein users in close proximity are scheduled to use channels in a manner that creates minimum co-channel interference. These techniques can be employed only in systems where all channels are managed by a central resource manager that has knowledge of all resources and of all user communications needs. Centralized resource management requires that communication links be established between different users so that the channel allocation process can be controlled and monitored. Moreover, as systems evolve from circuit-centric operation to packet-centric operation, the channel utilization pattern becomes much more dynamic, leading to further implementation difficulties (e.g., the channel utilization may change more quickly than the response time of the channel allocation process, making it essentially ineffective). Future communications systems may not have a central system resource manager nor be able to define geographic reuse regions and, as a result, resource management may have to be distributed to all users.

Notwithstanding the above, more and more system operators are taking advantage of unlicensed frequency bands for transmitting information. Because the number of transmitters within an unlicensed frequency band is not restricted, there exists the potential of greatly increased co-channel interference. The co-channel interference problem in unlicensed frequency bands is exacerbated by the fact that it is desirable to minimally constrain users of these bands in order to encourage innovation. Thus, the usage rules for unlicensed frequency bands are typically defined in a simple etiquette. Operators within the unlicensed band typically do not have to synchronize to a common source, and co-channel interference is therefore often asynchronous in that the interfering signal does not align in time with the desired signal. Moreover, the etiquette may not require all users to use the same data modulation so that different users may not be able to decode one another's transmissions to obtain information that might be useful for mitigating co-channel interference.

The well known problem of hidden nodes further complicates spectrum sharing especially among heterogeneous users. The hidden node problem occurs when only one of the two transceivers of an active communications link can be detected by a third user that is exploring the possibility of sharing a specific channel. If the third user cannot detect the active user in the ongoing communications, the third user may infer that the channel is vacant and begin using that channel.

Because of the above-mentioned problems, a need exists for a method and apparatus for reducing both synchronous and asynchronous co-channel interference within an unlicensed communication system.

DETAILED DESCRIPTION OF THE DRAWINGS

In order to address the above-mentioned need, a method and apparatus for reducing interference within a communication system is provided herein. In particular, a communication system is provided that enables a plurality of pairs of users to communicate their channel utilization time periods by using the durations and start or stop times of certain transmissions to signal the start times and durations of later transmissions. Other system users using possibly different communications protocols and different modulation technologies can measure the durations and start or stop times of received transmissions and to infer channel usage based on these durations and start or stop times.

Because the duration and start or stop time of a received transmission infers a start time and duration of a different transmission, the classical hidden terminal problem is mitigated. Additionally system capacity and quality of service will be enhanced for unlicensed spectrum by improving channel efficiency and reducing data loss due to the collisions of transmissions.

Figure 1:
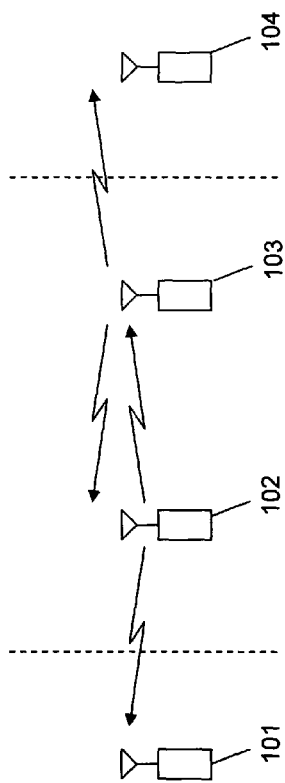
FIG. 1 is a block diagram of a communication system in accordance with the preferred embodiment of the present invention.

Turning now to the drawings, wherein like numerals designate like components, FIG. 1 is a block diagram of communication system 100 in accordance with the preferred embodiment of the present invention. As shown, communication system 100 comprises a plurality of transceivers (or nodes) 101–104, each capable of both transmitting and receiving communications. Although only four transceivers are shown, one of ordinary skill in the art will recognize that any geographical region may contain many transceivers, each transmitting and receiving utilizing one of many communication system protocols. For example, it is easily envisioned that nodes within communication system 100 may utilize an IEEE 802.11b Wi-Fi™ (WLAN) protocol, while others use a Bluetooth™ protocol, an IEEE 802.15.3 WiMedia™ (WPAN™) protocol, or an IEEE 802.15.4 (ZigBee™) system protocol. These protocols would be enhanced in accordance with the present invention to function more efficiently in the communication system 100. Additionally, nodes within communication system 100 may use enhanced versions of any of the next-generation cellular protocols such as, but not limited to cdma2000, or Wideband CDMA.

Thus, in accordance with the preferred embodiment of the present invention communication system 100 comprises many transceivers utilizing a number of communication system protocols, each transmitting and receiving within a certain frequency band.

As discussed above, the users transmitting within the same channel (e.g., frequency band, time slot, or spreading code), cause substantial interference within communication system 100. An example of such co-channel interference is described in the hidden node problem. During such a scenario, nodes 102 and 103 are communicating with each other. Nodes 101 and 104 are monitoring for detection of transmissions from 102 and 103 in order to avoid transmitting when other nodes are transmitting. However, in the hidden node problem, node 101 can detect transmissions from node 102, but not node 103, since the propagation loss from node 103 to node 101 is too high. Similarly, node 104 can detect transmissions from node 103, but not node 102, since the propagation loss from node 102 to node 104 is too high. Because of this, nodes 101 and 104 may transmit during time periods when nodes 103 and 102 (respectively) are transmitting, causing co-channel interference for nodes 102 and 103. In other words, since node 101 cannot detect transmissions of node 104, node 101 does not know that node 104 is transmitting, and may transmit simultaneously with node 104. Thus node 102 will hear transmissions from both nodes 101 and 104. The same situation applies to the transmission of node 104.

Figure 2:
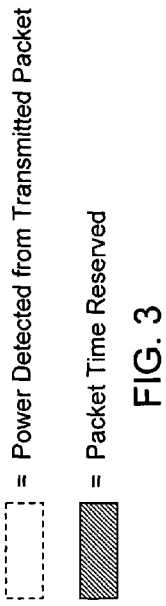
FIG. 2 through FIG. 6 illustrate channel reservation schemes in accordance with the preferred embodiment of the present invention.

In order to address co-channel interference, in the preferred embodiment of the present invention for isochronous transmission, a channel utilization scheme (or etiquette) is proposed that allows the inference of transmission parameters for nodes that are not detected from measurements of the transmissions of nodes that are detected. In particular, a channel structure is defined that utilizes packet association such that detection of the duration and/or start or stop time of one packet uniquely defines both the start times and durations of the associated packets. In particular, a node within communication system 100 determines a transmit duration of a first transmitter (remote unit), and based on the duration and start or stop time, the node infers a start time and duration of a second transmitter. The node can then transmit during a particular time period that avoids interfering with the first and the second transmitters. This is accomplished by all nodes associating a duration of transmission with a particular packet pair. An example of such packet channel structure is depicted in FIG. 2, where the duration of each packet is unique. In this example, $1_A<2_A<3_A<1_B<2_B<3_B$, where $N_x$ (e.g., $1_A$) denotes the duration of the packet. Although FIG. 2. depicts a finite set of durations, it will be understood by those skilled in the art that an infinite set of durations is also possible, based on a defined relationship between the durations of packet A and B. For example, a relationship such as $N_B=e^{N_A}$ may be defined where $N_B$ is always greater than $N_A$ over the range of $N_A$. It should also be appreciated that the adjacent time position of the packets as shown in the example improves the coexistence of isochronous and asynchronous data transmissions by efficiently packing the isochronous packet pairs together, rather than spreading the packet pairs apart in time.

The above-described channel structure permits efficient time-sharing of spectrum among heterogeneous devices that cannot communicate with each other by other means (e.g., because they are utilizing differing communication protocols) or among homogeneous devices where the signal quality is insufficient for decoding of packets. The packet channel structure provides high flexibility in data rates via variable packet sizes. For isochronous data, a frame period or repeat delay time is defined and an implicit reservation is inferred for the packet pair one frame period later from measurements of transmissions during the current frame period, thus facilitating high quality of service for real-time applications. Another channel structure comprised of a sequence of packets is described for asynchronous data (i.e., does not require a common clock between the communicating devices) where detection of the transmit duration and start or stop time of one packet, either a Request-To-Send (RTS) packet or a Clear-To-Send (CTS) packet, reserves time for the completion of the packet sequence that includes a variable duration data packet and an acknowledgement packet and alternatively, an acknowledgement-received packet.

Figure 3:
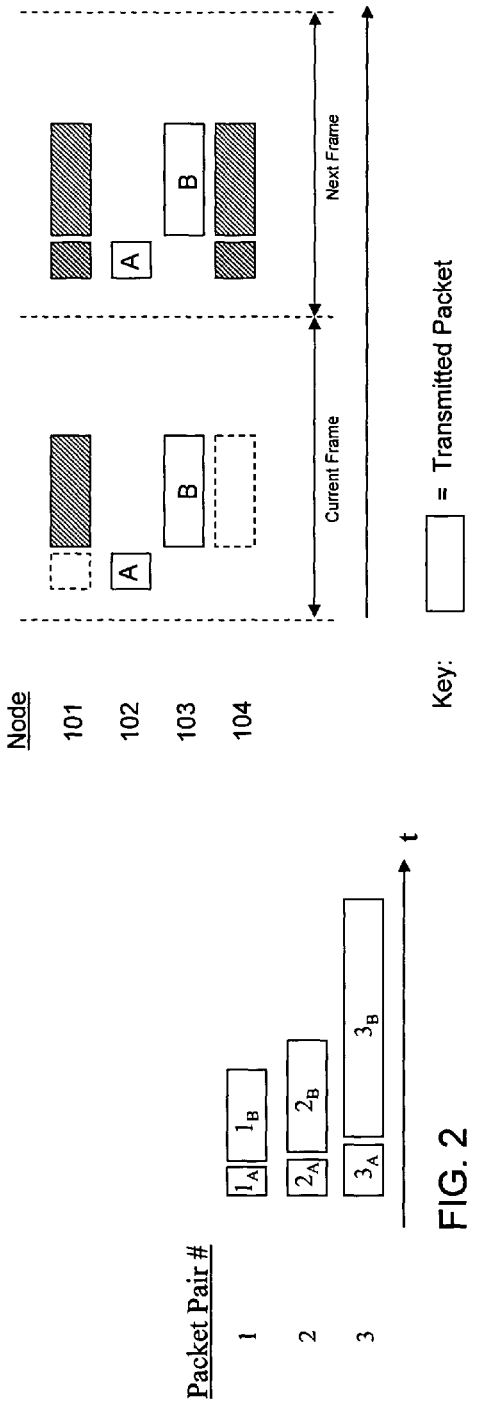

Such a channel reservation scheme for isochronous data is illustrated in FIG. 3. As shown, node 102 and node 103 transmit packets in the current frame. It is assumed that transmissions are on a similar frequency. Node 101 detects packet A from node 102, but cannot detect packet B from node 103. However, because the duration and start or stop time of the detected packet A uniquely defines both the start time and duration of the associated packet B, node 101 can determine that node 102 is receiving during packet B and reserves that packet time in the current frame. In order to prevent interfering with node 102, node 101 will avoid transmitting on the channel for those time periods. Also, since the detection of a packet implicitly infers reservation in the following frame, the packet times for packets A and B are reserved in the next frame as shown. Similarly, node 104 detects packet B from node 103, but cannot detect packet A from node 102. Upon detection of packet B, node 104 reserves the packet times for packets A and B in the next frame.

Note that contention from node 104 may occur during the first transmission of packet A, since node 104 cannot detect packet A. Ensuring that packet A is short in duration can minimize this contention. Reservation of packet times for both packet A and B is inferred in the next frame and may be extended frame by frame thereafter. The frame period must be known for reservation of packet time in the next frame. Frame period may be fixed or may be variable and communicated or modified via other means. In the preferred embodiment of the present invention, frame period is fixed and known by all nodes.

In an alternate embodiment, the durations of transmissions A or B define a frame period as well where a mix of multiple frame periods are employed simultaneously. Multiple frame periods can most efficiently coexist if the frame periods are related by powers of 2; e.g., frame periods proportional to 1, 2, 4, etc. For example, it is possible to use time duration of the packets to define the frame period, where a predetermined frame period is associated with each packet duration; i.e., each packet pair, and different frame periods coexist simultaneously.

Although packet duration and start or stop time is the preferred embodiment to uniquely define both the start times and durations the associated packets, one of ordinary skill in the art will recognize that other features may also be utilized that require only signal detection and not decoding of the packet. For example, one other possible feature is the use of codes; e.g., multiple pulses of power during a packet transmission whose pattern of pulses defines the start times and durations of the associated packets. Another example is symbol rate, where the rate characteristic utilized for transmission of symbols may be detected using a symbol rate detector to define the start time and duration the associated packets.

The following text describes the preferred embodiments of channel structure and packet reservation for asynchronous data. The preferred embodiment of the present invention may also be applied to a single non-reoccurring packet reservation sequence. This is an extension of the classic Request-To-Send (RTS)/Clear-To-Send (CTS) sequence where the time reserved for the subsequent packet is variable and communicated using a means only requiring signal detection.

Figure 4:
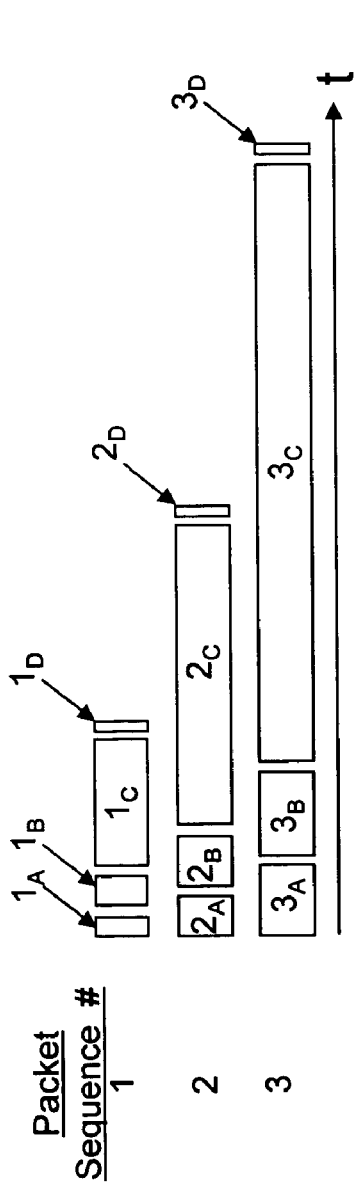

The preferred embodiment utilizes time duration and start or stop time of the RTS/CTS transmissions to uniquely define the duration and time position of the succeeding packets. This is illustrated in FIG. 4. As shown, packet A and packet B in all sequences are used to transmit the RTS and CTS respectively. Packet C is the data packet of variable duration (from a finite set of predetermined durations) and packet D is the acknowledgement (ACK) packet. In this example, $1_D=2_D=3_D<1_A<1_B<2_A<2_B<3_A<3_B<1_C<2_C<3_C$ where $N_x$ (e.g. $1_D$) denotes the duration of the packet. As previously described, an infinite set of durations is also possible based on a defined relationship between packet durations. Since the time durations of packets A and B are unique, the time duration and start or stop time of packet A may be used to uniquely define the time duration and time position of packets B, C, and D. Similarly, the time duration and start or stop time of packet B may be used to uniquely define the time duration and time position of packets C and D. As previously described, codes (multiple pulses of power coded by on-off timing) or symbol rates with start or stop times may also be used to define the duration and time position of packets B, C, and D.

Figure 5:
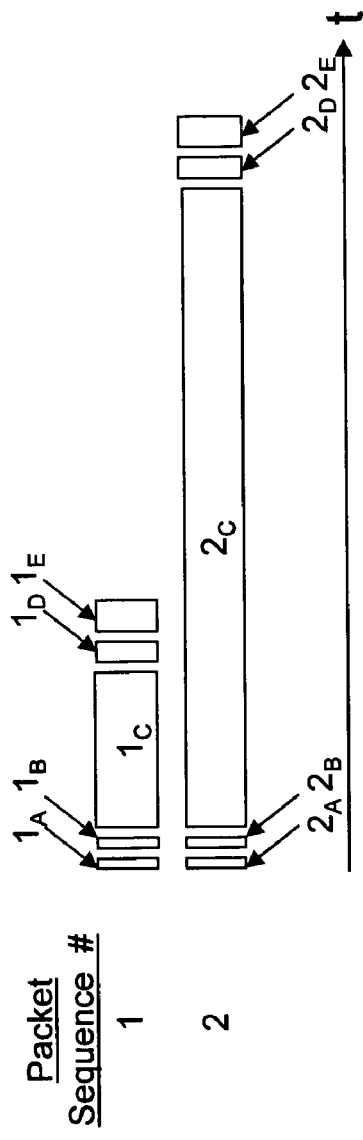

An alternative to the above is to utilize the RTS and CTS to initiate a packet sequence of continuously variable time duration. The duration of this sequence may be 'open-ended'; i.e., the duration need not be defined by the RTS and CTS. However, this sequence is terminated after the data packet by transmission of an acknowledgement (ACK) packet and an acknowledgement-received (ACK-RCV) packet. This is illustrated for two different duration data packets in FIG. 5 where packet A and B are RTS and CTS respectively, packet C is the data packet of continuously variable duration, and packet D and E are ACK and ACK-RCV respectively. In this example using time duration, $1_A=2_A=1_B=2_B<1_D=2_D<1_E=2_E<X_C$ where $X_C$ is the duration of any data packet. Note that the duration and start or stop time of packet D uniquely defines the duration and time position of packet E and the end of the packet sequence. Similarly, the duration and start or stop time of packet E uniquely defines the end of the packet sequence. In the event that neither packet D nor packet E is received, a predetermined timeout may be utilized to terminate the sequence by default.

Figure 6:
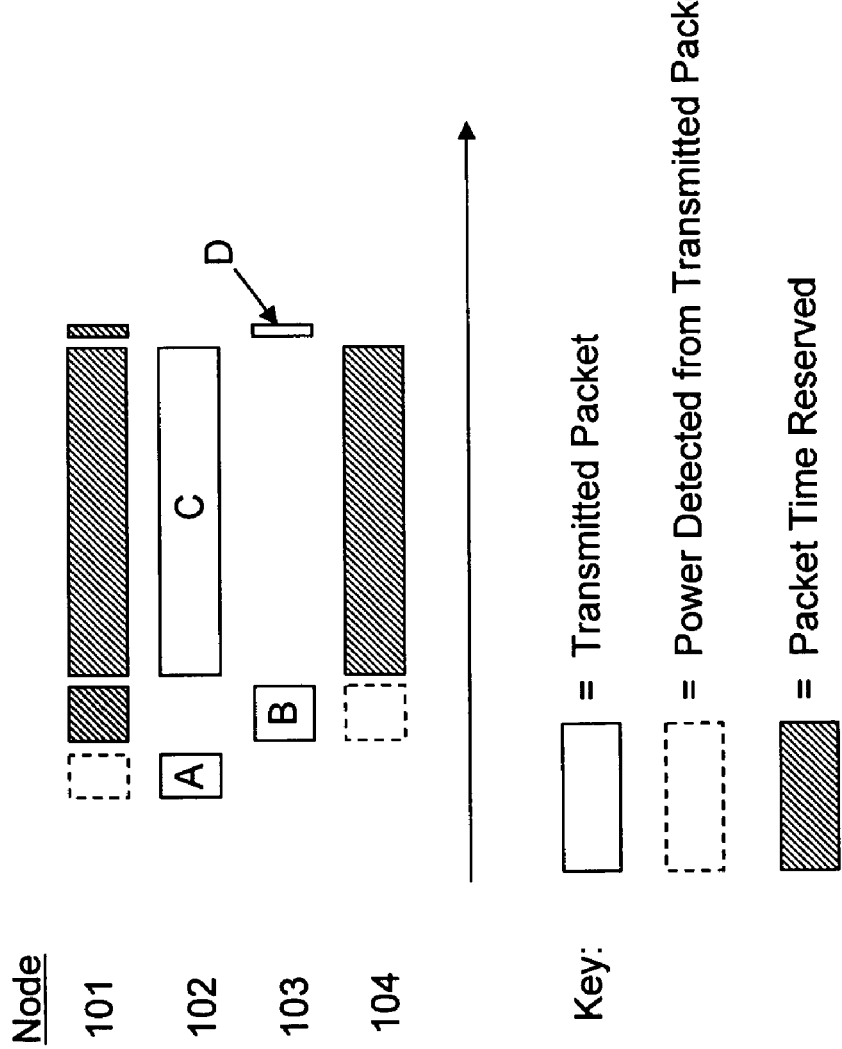

Again referring to the example of the hidden terminal problem described above, the operation of packet reservation for non-reoccurring packets is illustrated in FIG. 6 where the durations and start or stop times of packets A and B define the remainder of the packet sequence. In other words, determining a transmit duration and a start or stop time for a transmission indicates to other users, the future channel use times. Node 101 detects the transmitted packet A from node 102, but cannot detect packet B from node 103. However, based on the packet channel structure, the duration and start or stop time of the detected packet A uniquely defines both the start times and durations of the associated packets B, C, and D. Therefore, node 101 can determine that node 102 is receiving during packets B and D and transmitting during packet C and reserves the associated packet times. Similarly, node 104 detects packet B from node 103, but cannot detect packets A or C from node 102. Upon detection of packet B, node 104 reserves the packet time for packets C and D. Note that possible contention from node 104 exists during packet A, since node 104 cannot detect packet A. Ensuring that packet A is short in duration can minimize this contention.

When utilizing ACK and ACK-RCV packets (used to enable continuously variable data packet duration), node 101 and node 104 reserve time on a continuous basis from the detection and packet A and/or packet B until the end of packet E. Due to the predetermined durations and relative time positions of packets D and E, the detection of either packet D or E uniquely defines the end of packet sequence. As previously described, a timeout may be used in the event that neither packet D nor E is detected.

Figure 7:
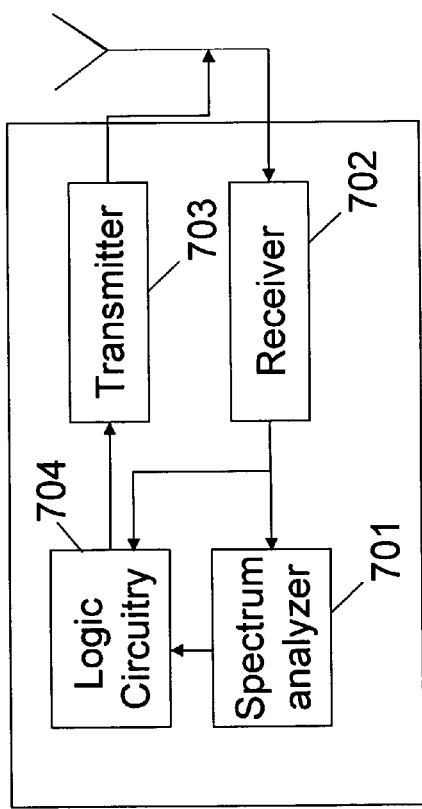
FIG. 7 is a block diagram of a node in accordance with the preferred embodiment of the present invention.

FIG. 7 is a block diagram of a node 700 in accordance with the preferred embodiment of the present invention. As shown, node 700 comprises spectrum analyzer 701, receiver 702, transmitter 703, and logic circuitry 704. In the preferred embodiment of the present invention spectrum analyzer 701 is circuitry designed to analyze a received signal in order to determine a duration and start or stop time of a transmission. For example, spectrum analyzer may comprise simple circuitry such as a bandpass filter followed by a power detector circuit. Receiver 702 and transmitter 703 are well known components designed to operate utilizing the protocol/channel in which receiver 700 operates. For example, for systems utilizing a 802.11b system protocol, transmitter 703 and receiver 702 are enhanced 802.11b components designed to transmit/receive utilizing the 802.11b system protocol and the present invention. Finally, logic circuitry 704 is preferably a microprocessor/controller such as but not limited to a Motorola PowerPC microprocessor.

During operation, receiver 702 receives all signals (if any) transmitted over a particular frequency band, down converts the signal and outputs the down converted signal to spectrum analyzer 701. The spectrum analyzer analyzes the received power rise and fall times for any transmitted signals (not just the protocol used by the tranceiver 700) over the particular frequency band and passes this information to logic circuitry 704. Logic circuitry 704 analyzes a transmit duration, and based on the transmit duration, infers when other nodes will be transmitting. Based on this inference, logic circuitry 704 instructs transmitter 703 to transmit during predetermined time periods where such transmission will limit interference to surrounding nodes.

It should be obvious that for communication system 100 to work most efficiently, all nodes operating within communication system 100 must obey predetermined rules on the duration and time position of transmissions. In other words, transmission of a packet with a particular duration implies that a second source will occupy a second duration/time position within the frame or frames. Such information can be pre-stored within all nodes in table-form, or alternatively may be downloaded from a common source. Tables 1 and 2 illustrate simple packet duration tables in accordance with the preferred embodiment of the present invention. In the preferred embodiment of the present invention each frame is comprised of time units,

TABLE 1

Durations for Isochronous Packet Pairs

| Packet Pair # | Duration for A | Duration for B |
|---|---|---|
| 1 | 2 | 8 |
| 2 | 5 | 16 |
| 3 | 9 | 32 |
| 4 | 13 | 64 |
| 5 | 17 | 128 |
| 6 | 21 | 256 |
| 7 | 24 | 512 |
| 8 | 27 | 1024 |

TABLE 2

Durations for Asynchronous Non-Reoccurring Packets

| Packet Sequence # | Packet A Duration | Packet B Duration | Packet C Duration | Packet D Duration |
|---|---|---|---|---|
| 1 | 4 | 3 | 10 | 1 |
| 2 | 7 | 6 | 20 | 1 |
| 3 | 12 | 11 | 40 | 1 |
| 4 | 15 | 14 | 80 | 1 |
| 5 | 19 | 18 | 160 | 1 |
| 6 | 23 | 22 | 320 | 1 |
| 7 | 26 | 25 | 640 | 1 |
| 8 | 28 | 29 | 1280 | 1 |

As is evident, a particular packet sequence is comprised of packets of unique duration expressed as a number of time units. Since the order and spacing of the packets is defined (refer to the partial examples shown in FIGS. 2 and 4), the relative time position of the associated packet(s) of any packet sequence is also known. For example, if a node determines that another node is utilizing, for example, a transmission with a duration of 5 time units, then the node must be transmitting the "A" packet of packet pair #2 and receiving the "B" packet of packet pair #2 during each frame.

Figure 8:
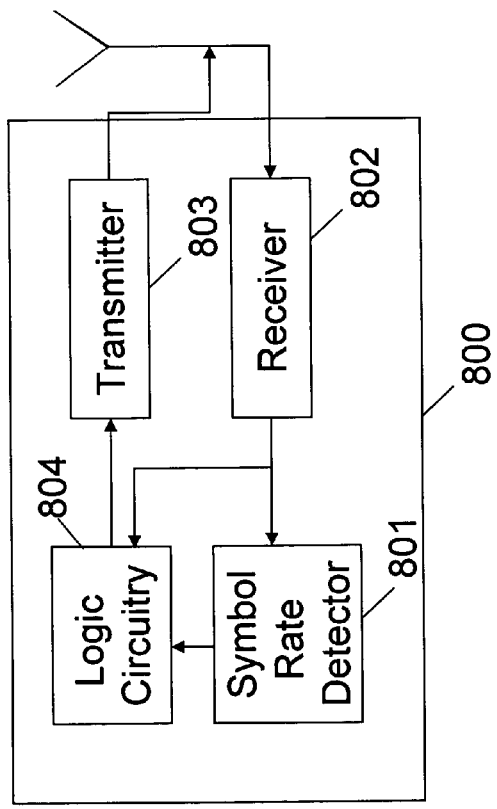
FIG. 8 is a block diagram of a node in accordance with an alternate embodiment of the present invention.

FIG. 8 is a block diagram of node 800 in accordance with an alternate embodiment of the present invention. As is evident, node 800 is similar to node 700 except that spectrum analyzer 701 has been replaced by feature detector such as a symbol-rate detector 801. During operation, rather than detecting the rise and fall of received power levels using a spectrum analyzer, the duration and start or stop time of a signal is determined by the presence of a symbol rate spectral line at the output of a non-linearity. Thus, by determining a symbol rate and a start or stop time for a transmission, one indicates to other users, the future channel use times. The non-linearity may be a well-known delay and multiply symbol rate detector. An advantage of using a feature detector rather than a conventional spectrum analyzer is the enhanced sensitivity of a feature detector. A disadvantage of using a feature detector is that the modulation symbol rate of the signal being detected must be known. If the symbol rate is not known, a search over all potential symbol rates is possible.

Figure 9:
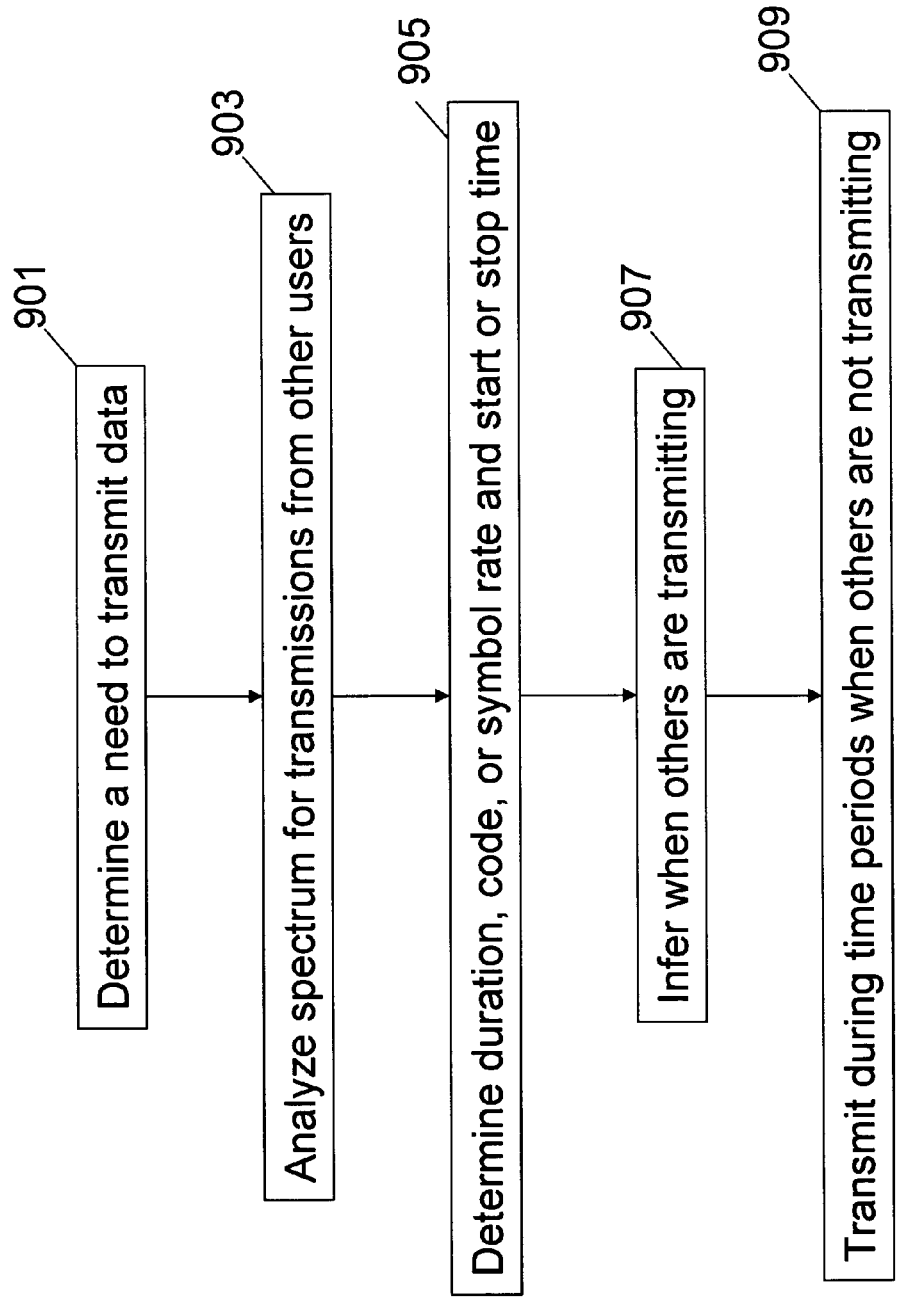
FIG. 9 is a flow chart showing operation of the nodes of FIG. 7 and FIG. 8.

FIG. 9 is a flow chart showing operation of the nodes of FIG. 7 and FIG. 8. The logic flow begins at step 901 where logic circuitry 704 determines a need to transmit data. At step 903, logic circuitry instructs receiver 702 to analyze the spectrum for possible transmissions from other uses. In the preferred embodiment of the present invention spectrum analyzer determines a rise and fall time of any transmissions, and in the alternate embodiment symbol rate detector determines a symbol rate and start or stop time. At step 905 logic circuitry 704 determines the duration, code, or symbol rate feature characteristic and start or stop time of the received signal and at step 907 infers when other nodes will be transmitting. Finally, at step 909 logic circuitry 704 instructs transmitter 703 to transmit during time periods when other nodes will not be transmitting.

As discussed above, for communication system 100 to work most efficiently, all nodes operating within communication system 100 must obey predetermined rules for duration and relative time position for such transmissions. Therefore, when logic circuitry 704 instructs transmitter 703 to transmit, that transmission must obey the rules set forth above in Tables 1 and 2.

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. A method for a first remote unit to reduce interference within a communication system, the method comprising the steps of:
    analyzing by the first remote unit, a first received signal from a second remote unit to determine a transmit duration or a symbol rate and start or stop time of the first received signal;
    based on the transmit duration or the symbol rate and the start or stop time of the first received signal, inferring when transmissions from a third remote unit will occur, wherein the third remote unit is out of communication range of the first remote unit and actively communicating with the second remote unit; and
    based on the inference, transmitting by the first remote unit during a time period to avoid interfering with the second and the third remote units.

2. The method of claim 1 wherein the step of transmitting during time periods to avoid interfering with the second and the third remote units comprises the step of transmitting during time periods when the second and the third remote units cease transmission.

3. The method of claim 1 wherein the step of transmitting comprises the step of associating the time period to an allowed duration of transmission, and transmitting at the time period for the allowed duration.

4. The method of claim 1 wherein the step of transmitting comprises the step of transmitting within a same channel as utilized by the second and the third remote units.

5. The method of claim 1 further comprising the step of:
    inferring a frame period based on the transmit duration or the symbol rate of the first received signal.

6. The method of claim 1 further comprising the step of:
    inferring a future transmission of the first and the second received signal based on a frame period.

7. The method of claim 1 wherein the step of analyzing the first received signal comprises the step of analyzing either a Request-To-Send (RTS) packet or a Clear-To-Send (CTS) packet.

8. An apparatus comprising:
    a receiver receiving a transmission from a first transmitter;
    logic circuitry determining either a transmit duration or a symbol rate and a start or stop time of the first transmitter and inferring a start time and duration of a second transmitter based on either the transmit duration or the symbol rate and start or stop time of the first transmitter, wherein the second transmitter is out of communication range and is actively communicating with the first transmitter; and transmission circuitry transmitting during a time period to avoid interfering with the first and the second transmitters;

wherein the step of receiving the transmission from the first transmitter comprises the step of receiving a Request-To-Send (RTS)/Clear-To-Send (CTS) sequence from the fist transmitter and the time duration of the RTS/CTS transmissions to uniquely define a time duration of succeeding packets.

9. The apparatus of claim 8 wherein the duration or symbol rate and staff or stop time of the received transmission uniquely defines a start time and duration of the second transmitter.

* * * * *